United States Patent [19]
Yang

[11] 3,933,515
[45] Jan. 20, 1976

[54] THERMAL SHOCK RESISTANT ASBESTOS-CEMENT COMPOSITIONS AND THEIR PREPARATION

[75] Inventor: Julie Chi-Sun Yang, Somerset, N.J.

[73] Assignee: Johns-Manville Corporation, Denver, Colo.

[22] Filed: Sept. 6, 1974

[21] Appl. No.: 503,906

Related U.S. Application Data

[63] Continuation of Ser. No. 289,035, Sept. 14, 1972, abandoned.

[52] U.S. Cl. ............................................ 106/99
[51] Int. Cl.² ........................................ C04B 7/02
[58] Field of Search ............... 106/98, 99, 119, 120

[56] References Cited
UNITED STATES PATENTS

| | | | |
|---|---|---|---|
| 1,314,772 | 9/1919 | Viens | 106/99 |
| 1,355,406 | 10/1920 | Mattison | 106/99 |
| 2,496,895 | 2/1950 | Staley | 106/99 |
| 2,586,726 | 2/1952 | Schuetz et al. | 106/99 |
| 3,449,140 | 6/1969 | Yang | 106/117 |
| 3,667,977 | 6/1972 | Harbison | 106/99 |

*Primary Examiner*—Winston A. Douglas
*Assistant Examiner*—John P. Sheehan
*Attorney, Agent, or Firm*—Robert M. Krone; James W. McClain

[57] ABSTRACT

A thermal shock resisting asbestos-cement composition is prepared by adding a finely divided porosity increasing additive as a partial or complete replacement for silica flour in an asbestos-cement composition containing asbestos fibers, portland cement, and silica flour. The composition is shaped and cured to form the final thermal shock resistant product.

8 Claims, No Drawings

THERMAL SHOCK RESISTANT ASBESTOS-CEMENT COMPOSITIONS AND THEIR PREPARATION

This is a continuation of application Ser. No. 289,035, filed Sept. 14, 1972, which is now abandoned.

FIELD OF THE INVENTION

This invention relates to new asbestos-cement compositions and their methods of preparation, and more particularly to asbestos-cement compositions having improved thermal shock resistance.

BACKGROUND OF THE INVENTION

Articles made from mixtures of cement and asbestos containing from about 10% to 50% by weight of asbestos fibers are employed today in large quantities. The manufacture and sale of these asbestos-cement articles are commercially very important. Sheets and boards of the asbestos-cement type find widespread use in the building and construction industries because they are fireproof and have other desirable qualities.

Asbestos-cement products contain a hydraulic cement which has to be "set" or "cured" to achieve the final characteristic high strength of these products. Curing of asbestos-cement products may be accomplished under any conditions known to be useful for setting the cement to form final products of high strength. One curing method used where portland cement is employed is to store the final structure at room temperatures under highly humid conditions for about 7 to 30 days.

It is often desirable and necessary, however, to employ a shorter curing time. One method of achieving shorter curing times is to "autoclave" cure the asbestos-cement product in an autoclave under pressure of saturated steam for about 12 to 20 hours. Normally, an auxiliary cementing agent such as silica flour or quartz is used as a component of the cement binder if the final product is to be of steam cured, The silica material, under the conditions which prevail in an autoclave, reacts with the calcium hydroxide from the hydrated hydraulic cement to form part of the final binding matrix. Autoclave curing because of its rapidity is employed advantageously in commercial production of asbestos-cement products.

In the past, asbestos-cement products that have been steam or "autoclave" cured in an autoclave have provided thermal shock resistance properties at least equal to that of competitive building materials. These autoclaved asbestos-cement products have, however, tended to flake, exhibit large volume changes, or even explode when they are subjected to high temperatures when wet or saturated with water. An improvement in this aspect of the already high thermal shock resistance properties of asbestos-cement products is desirable because of the possibility of the asbestos-cement product becoming saturated with water during fire-fighting operations and then being exposed to intense heat.

OBJECTS OF THE INVENTION

Accordingly, it is a primary object of this invention to provide new asbestos-cement compositions that possess good thermal shock resistance after autoclaving, and to provide methods of making these compositions.

It is a further object of this invention to provide thermal shock resisting asbestos-cement compositions that maintain other desirable properties of such compositions, such as, sulfate resistance, and mechanical strength.

A still further object of this invention is to provide a method for providing thermal shock resisting asbestos-cement compositions that are inexpensive and easy to manufacture.

Additional objects and advantages of this invention will be set forth in part in the description which follows, and in part will be obvious from the description, or may be learned by practice of the invention. The objects and advantages are realized and attained by means of the processes, compositions, and combinations particularly pointed out in the appended claims.

SUMMARY OF THE INVENTION

In accordance with this invention, a thermal shock resisting asbestos-cement composition is provided comprising in percent by weight of dry solids (a) 10% to 50% asbestos fiber; (b) 25% to 65% portland cement; (c) 1% to 30% of a finely divided additive adapted to increase the porosity of the composition and (d) 0% to 40% of silica flour. This composition, when shaped to form as asbestos-cement article and autoclaved possesses thermal shock resistance superior to previous asbestos-cement articles, while maintaining the other desirable properties exhibited by prior autoclaved asbestos-cement articles. A major reason for the superior shock resistance is the increased porosity of the composition at high temperature which allows moisture to freely and gradually escape.

Conventional autoclaved asbestos-cement compositions contain up to 40% silica flour, but in accordance with the present invention, the silica content is either partially or entirely replaced by a finely divided organic or inorganic porosity increasing additive to provide increased thermal shock resistance. The compositions, after autoclaving, stay intact and retain appreciable strength under intense heating conditions, and when subjected to high temperatures while wet, or saturated with water.

This invention also embraces a method for producing a thermal shock resisting asbestos-cement product by either a wet process or a dry process, as will be seen hereinafter. If an extruding process is used, an additional additive, for example, either Methocel or Polyox is preferably used to facilitate extrusion.

DETAILED DESCRIPTION OF THE INVENTION

In accordance with the method of this invention, an aqueous admixture of asbestos fibers, hydraulic cement, silica flour and a finely divided organic or inorganic additive adapted to increase the porosity of the composition is formed. As stated above, the silica flour can be totally eliminated and substituted with the additive.

As here embodied, a major ingredient of the preferred new asbestos-cement composition of this invention is hydraulic cement. A wide variety of hydraulic cement materials usable in the invention are known and are commercially available. Preferably, the cement should be of the alkaline type, that is, a hydraulic cement, which, when mixed with water produces a slurry having a pH above 7. Portland cement is particularly useful and all types of this cement appear to function satisfactorily. The amount of hydraulic cement useful in the present invention varies between 25% and 65%, based on the dry weight of total solids, with the lower percentages of the range being preferred for autoclaved products containing relatively high percentages of $SiO_2$.

The asbestos-cement compositions of the present invention may contain an auxiliary cementing agent in the form of silica flour or finely divided quartz. The silica flour, under the conditions which prevail in steam curing, reacts with the hydraulic portland cement to form the final binding matrix. Usually, autoclaved asbestos-cement compositions contain from about 20 to 40% silica, based on the dry weight of total solids and such percentages, less the percentage of additive employed, can be used in the present invention. Preferably the compositions of the present invention contain between 5 to 15% silica flour, based on the dry weight of total solids.

An essential component of the new composition is asbestos. All types and grades of asbestos fibers may be used, either alone or in mixtures thereof, but chrysotile asbestos is preferred. Any of the grades of the grading system of the Quebec Mining Association may be used. In this grading system, the higher numbers in general indicate the shorter fiber and thus, of the grades of fiber in general commercial use, grade 7 covers asbestos of the shorter fiber, with the fiber becoming longer as the grades proceed up to grade 1. Other types of asbestos may also be used to provide the fiber content of the new asbestos-cement compositions, including amphibole asbestos such as crocidolite, amosite, tremolite and anthophyllite. Autoclavable asbestos-cement compositions usually contain from 10% to 50% of asbestos, based on the dry weight of total solids, and these percentages can be used in the present invention.

In accordance with the invention, the asbestos-cement compositions contain finely divided additives as stated hereinabove. One such group of additives may be inorganic mineral additives selected from the group consisting of asbestos tailings, asbestos floats, talc, serpentine rock, and mica to improve thermal shock resistance. Another group of additives may be organic additives such as, nylon fibers, orlon fibers, sisal fibers or the like. A third group of additives (either organic or inorganic) may be those which decompose or dehydrate at elevated temperatures, examples of such additives being wood fibers, diatomaceous earth, magnesium hydroxide, magnesium carbonate or the like. In any case, the additives are of the type which will increase porosity and, therefore, thermal shock resistance of the ultimate product when the latter is subjected to temperatures approaching 700°C.

These additives are used as replacements for the silica flour in amounts up to 40% of the total dry weight of the composition, and, in face, can be used to entirely replace the silica flour content of the asbestos-cement composition. Preferably, the composition contains 1% to 30% of these additives based on the dry weight of total solids, or a replacement of about one-third least onethird to all of the total silica flour normally used in asbestos-cement composition. The amount of additive which is optimum varies for each additive within the 1% to 30% weight range and can be precisely determined by routine testing.

The new asbestos-cement formulations in which these additives are substituted as a replacement of the silica flour or quartz show exceptional thermal shock resisting properties while exhibiting good sulfate resistance and mechanical strength comparable or superior to regular asbestos-cement steam curable compositions. It has been observed, however, that when the additive/silica ratio exceeds 17.5/12.5, a marked decrease in ultimate strength occurs.

The following Table 1 lists some additives which have been successfully used to improve thermal shock resistance in asbestos-cement products and the compositions of these additives.

Table 1

Composition of Mineral Additives Useful to Improve Thermal Shock Resistance

| Additive | Weight Percent (%) | | | | | | |
|---|---|---|---|---|---|---|---|
| | Ignition Loss(1000C) | Moisture (105C) | $SiO_2$ | MgO | CaO | $Al_2O_3$ | $Fe_2O_3$ | $TiO_2$ |
| Desert talc | 5.5 | — | 57.9 | 28.2 | 4.9 | 0.36 | 0.17 | 0.02 |
| Silvery talc | 25.2 | 0.1 | 28.0 | 23.2 | 20.7 | 0.9 | 0.4 (FeO-1.71) | 0.11 |
| Talc sold by C. S. Smith Co. | 17.95 | 0.10 | 40.13 | 34.60 | 0.82 | 0.82 | 2.99 | — |
| Ground fibrous serpentine rock | 12.4 | 0.99 | 33.5 | 38.4 | 0.01 | 0.5 | 14.3 | 0.05 |
| Calcined serpentine rock | — | — | 38.7 | 44.4 | — | 0.58 | 16.5 | — |
| Asbestos floats | 13.0 | 0.88 | 38.2 | 40.3 | 0.53 | 1.5 | 6.8 | 0.07 |
| Asbestos tailings | 12.9 | 0.77 | 37.0 | 37.2 | 0.56 | 2.0 | 9.4 | 0.05 |
| Pulverized asbestos fiber | 14.2 | 1.50 | 39.0 | 41.0 | 0.48 | 0.46 | 5.3 | 0.03 |
| Pulverized asbestos tailings | 16.3 | 1.30 | 36.7 | 39.2 | 0.70 | 0.80 | 5.0 | 0.08 |
| Calcined asbestos tailings | — | — | 44.0 | 46.4 | | | 10.9 | |
| Calcined asbestos tailings Mica | — | — | 42.1 | 43.3 | | | 6.3 | |

| Additive | Composition | | Weight Percent (%) X-ray Data* | Particle Size or Surface Area of Sample Additive |
|---|---|---|---|---|
| | $Na_2O$ | $K_2O$ | | |
| Desert talc | 1.7 | 0.83 | talc | −325 mesh |
| Silvery talc | 0.23 | 0.54 | talc, dolomite and tremolite | 95%−325 mesh |
| Talc sold by C. S. Smith Co. | — | — | talc | −325 mesh |
| Ground fibrous serpentine rock | 0.03 | 0.07 | serpentine | −325 mesh |
| Calcined serpentine rock | — | — | serpentine | −325 mesh |
| Asbestos floats | 0.08 | 0.01 | chrysotile and magnetite | 12,200 cm²/q |
| Asbestos tailings | | | | 16,000 cm²/q |
| Pulverized asbestos fiber | | | | 38,000 cm²/q |
| Pulverized asbestos tailings | | | | 36,500 cm²/q |
| Calcined asbestos tailings | | | forsterite | −325 mesh |
| Calcined asbestos tailings | | | forsterite | −325 mesh |

Table 1-continued

Composition of Mineral Additives Useful to Improve Thermal Shock Resistance

| Additive | Composition | | | | | | | |
|---|---|---|---|---|---|---|---|---|
| | Ignition Loss(1000C) | Moisture (105C) | SiO$_2$ | MgO | CaO | Al$_2$O$_3$ | Fe$_2$O$_3$ | TiO$_2$ |
| Mica | | | | | mica (plus traces of quartz) | | 90%—325 mesh | |

*talc 3MgO.4SiO$_2$.H$_2$O, tremolite Ca(Mg,Fe)$_3$.(SiO$_3$)4.xH$_2$O, dolomite CaCO$_3$.MgCO$_3$, serpentine and chrysotile 3MgO.2SiO$_2$.2H$_2$O, pyrophyllite Al$_4$Si$_8$O$_{20}$(OH)$_4$, forsterite Mg$_2$SiO$_4$, hectorite Mg$_{5.33}$Li$_{0.67}$Si$_8$O$_{20}$(OH)$_4$, mica K$_2$[Al$_2$Si$_6$]Al$_4$O$_{20}$(OH)$_4$, magnetite Fe$_3$O$_4$ The additives listed in Table 1 can be classified in two mineral groups according to their chemical composition, a first group of magnesium silicate containing minerals, and a second group of aluminum silicate containing minerals. The first group of magnesium silicate containing minerals include a wide range of asbestos tailings, asbestos floats, serpentine rock and platy talc.

"Asbestos tailings" are obtained from the manufacture of commercial asbestos. The tailings differ from commercial asbestos in that commercial asbestos is mainly formed of fibers whereas the tailings are the undersized fractions from the screening operation of the asbestos fibers which consist of small granular particles interspersed with very short asbestos fibers plus asbestos fibers adhering thereto and associated magnetite. "Asbestos floats" is the fine asbestos material carried by the air stream from cyclone collectors or other exhaust system during the grading operation. Serpentine rock or ground fibrous serpentine rock consists of a mixture of ground quartz, feldspar silica, etc., with a great number of small particles of fibrous serpentine having extremely short fibers, and is the residue obtained from the removal of asbestos from the ground rock by suction and screening. Typical talcs include desert, silvery, and C. S. Smith talc, having the chemical composition listed above in Table 1.

The minerals of the aluminum silicate group that are useful in the present invention include mica. Other aluminum silicate minerals such as pyrophyllite, dehydrated kaolin clay, volcanic tuff, obsidian, and ultrafine perlite have also been tested, but have not been found to impart improved thermal shock resistance to asbestos-cement compositions.

Of the minerals that are useful in the present invention, the talc and mica are platy minerals whereas the tailings, floats, and serpentine rock have a fibrous structure. The minerals can be used in their "as received" finely divided natural form if the average particle size is in the range 10 to −325 mesh. Some mineral additives such as the asbestos tailings and floats can be calcined before use to form an amorphous material and can be further pulverized to the mesh sizes described above to facilitate chemical reaction. Table 1 above lists in its last column typical particle sizes and surface area of additives that have been successfully used to improve thermal shock resistance. Particle sizes as small as −325 mesh (U.S. Screen size), have been satisfactorily used.

Other ingredients such as fillers, wetting agents, flexing agents, plasticizing agents, dyes, pigment, lubricants, mold release agents, cement accelerators and the like may be included while utilizing the novel advantages attendant with the use of platy or fibrous additives in asbestos-cement compositions as disclosed herein. In addition, as stated above, organic additives such as nylon, orlon, sisal or the like which melt or otherwise increases porosity at elevated temperatures may be used in place of the inorganic additive, as well as those additives which decompose or dehydrate.

The wet admixture of cement, asbestos-fiber, silica flour and additive is preferably prepared by forming a dry furnish, that is, a mixture of all the dry ingredients as a preliminary step in the operation, and then mixing the dry furnish with water. Various types of dry mixers can be employed in forming the dry furnish. For example, rotating arm mixers, rotary tumbling of mixers, beater mixers, air suspension mixers, or the like can be used. Dry mixing should be carried out for a sufficient length of time to insure the formation of a uniform dry furnish, usually between about 1 to 15 minutes.

After the dry furnish is formed, a wet mixing step is necessary to incorporate the water into the composition. Vigorous mixing conditions are recommended for this wet mixing step in order to insure thorough and intimate distribution of the water or aqueous solution with the other components of the compositions.

Asbestos-cement boards, sheets, shingles, pipe, and other shapes and objects can, in accordance with this invention, be produced by both the so-called "wet" and "dry" processes.

In the dry process used to form asbestos-cement articles, the dry materials (asbestos, silica, cement, and additives) are blended together and formed into batches by weight. Sufficient water is added to each batch to form a plastic dough-like mass which can be molded, calendered, pressed or extruded to shape retaining products prior to the curing operations. When the plastic body is extruded, an extrusion facilitating additive (hydromodifier) such as Methocel or Polyox is preferably provided.

In the "wet" process, enough water is mixed with the dry furnish to form a slurry containing 5% to 20% solids. Such a process involves passing the aqueous slurry to a vacuum belt comprising a traveling wire screen which acts as a filter element to collect the dispersed solids of the slurry as the latter is removed through the screen. The shaped mass is then removed from the screen, passed through a series of press rollers to remove more water, passed through a series of heated drying rollers to remove still more water, and finally through calender rolls to finish the shaped slurry into final form such as a board or panel. After the slurry is formed to shape, it is repressed to compress it to any desired density.

In accordance with the present invention, the shaped composition is preferably autoclaved. Any of the conventional autoclave curing techniques and conditions can be used to autoclave cure the compositions of the present invention. For example, the shaped compositions may be first cured at room temperature for a period of about 24 hours at a relatively humidity of 100 percent, and then placed in an autoclave under pressure of saturated steam to complete the steam cure.

In the autoclave, the shaped compositions are subjected to steam pressure of about 70 to 170 psig at a temperature of about 150° to 190°C for about 12 to 20 hours. For example, a saturated steam pressure of about 100 psig and a temperature of 170°C for a period of 16 hours has been satisfactorily used. The autoclaving or steam curing treatment accelerates chemical reactions which may ordinarily take place very slowly or which may not even occur at ambient conditions.

As previously stated, the thermal shock properties of the new asbestos-cement compositions of the present invention are remarkably improved over previous asbestos-cement compositions. Prior asbestos-cement products have good thermal stability up to 540°C (around 1000°F) at normal moisture content. When these prior products are saturated with water or are at an extremely high moisture content, they explode and shatter to small fragments when exposed directly to a temperature of 700°C or more. While the reasons for the improvement in thermal shock resistance obtained by the present compositions have not been precisely defined, it is theorized that both the physical and chemical nature of the additives are important in bringing about this improvement.

It is believed that all of the effective additives, when packed in the asbestos-cement product, form voids and channels in the cured products, thereby allowing steam to escape gradually without build-up of a high steam pressure. For example, most of the additives comprising the inorganic group set forth above tend to shrink at high temperatures while these additives comprising one organic group tend to melt. On the other hand, the wood fibers and magnesium hydroxide will decompose while the diatomaceous earth will dehydrate. It is further theorized that the improvement in thermal shock resistance exhibited by the products of the present invention may, in part, be attributed to the pozzolanic activity of the additives, that is, their ability to react with the lime that is ordinarily released from portland cement under autoclave or steam curing conditions to form a strength contributing and chemically stable binding material.

In addition to possessing improved thermal shock resistance, the steam-cured asbestos-cement products of the present invention exhibit good sulfate resistance and mechanical strength and, in fact, often possess superior sulfate resistance. The autoclave cured asbestos-cement products of the present invention can be used for such products as fireplace panels, chimney stacks, covering for fireproofing beams and like applications.

The following examples are presented to provide a more complete understanding of the invention. Specific techniques, conditions, materials and proportions set forth are exemplary and should not be construed as limiting the scope of the invention. All percentages listed in this application are weight percentages unless otherwise noted, and all screen sizes are U.S. Standard unless stated to be otherwise.

EXAMPLE 1

A number of asbestos-cement compositions are prepared by forming dry furnishes containing 50 percent portland cement, 20 percent asbestos, and 30 percent of a mixture of silica flour and a finely divided porous providing additive. A number of compositions containing no silica flour and 30 percent additive are also prepared along with a control composition containing no additive but 30 percent silica flour. Each of these compositions is mixed with water and shaped into 8 inch by 3 inch by ¼ inch samples.

These samples are cured at 100 percent relative humidity and room temperature for 24 hours, and are then autoclaved at 170°C and 100 psig for 16 hours. After autoclaving, the samples are saturated in water for 24 hours, and then placed directly in a furnace at 700°C for one hour to test their resistance to thermal shock. The results are summarized in Table II which sets forth the various additives and the percent additive replacing the silica flour. As noted in this table, with no additive, the sample exploded in two to three minutes after being placed in the furnace. In most cases, with the addition of larger amounts of additive, the sample did not explode.

Table II

| Effect of Additives on the Thermal Shock Resistance of Steam-cured Asbestos Current Products | | | | | | | | | | | | |
|---|---|---|---|---|---|---|---|---|---|---|---|---|
| Additive | 0 | 1.0 | 2.0 | 5 | 7.5 | 10 | 10–12.5 | 15 | 17.5 | 18.8 | 20 | 22.5 | 30 |
| Desert talc | X | | | * | | X | X | * | * | * | * | | |
| Silvery talc | X | | X | | | * | * | * | * | * | * | | * |
| C. S. Smith Talc | X | | | | | X | | X | * | | * | | |
| Serpentine rock | X | | | | | * | | * | * | | * | | |
| Calcined serpentine rock | X | | | | | * | | * | | | * | | |
| Asbestos floats (chrysotile) | X | | | | X | X | X | * | * | * | | * | |
| Asbestos tailings (chrysotile) | X | | X | X | | X | X | * | * | * | * | * | |
| Calcined asbestos tailings (chrysotile) | X | | | X | | 1 hr. cracked into 1 | | * | | | | | |
| Blue brand chrysotile | X | | | | | X | | * | | | | | |
| Pulverized chrysotile | X | | | X | X | X | X | * | * | * | * | + | |
| Chrysotile tailings | X | | | | X | X | | * | | | * | | |
| Pulverized chrysotile tailings | X | | | X | X | X | X | X | X | * | X | * | |
| Calcined chrysotile tailings | X | | | X | | * | | * | | | | | |
| Johns-Manville asbestos fiber(a) | X | X | X | | | * | | * | | | | | |
| Hectorite | X | | | | | X | | X | | | | | |
| Mica | X | | X | | X | | | * | | | | | * |
| Nylon | X | * | * | | | | | | | | | | |
| Orlon | X | * | * | | | | | | | | | | |
| Crimped orlon | X | * | * | | | | | | | | | | |
| Silica (quartz) | X | | | | X | X | | X | | | | | |

Table II-continued

| Effect of Additives on the Thermal Shock Resistance of Steam-cured Asbestos Current Products | | | | | | | | | | | | |
|---|---|---|---|---|---|---|---|---|---|---|---|---|
| Additive | 0 | 1.0 | 2.0 | 5 | 7.5 | 10 | 10–12.5 | 15 | 17.5 | 18.8 | 20 | 22.5 | 30 |

*remains intact
Xexploded in 2–3 min.
+small surface crack
(a)Munro M-100 chrysotile asbestos fiber These tests thus show that asbestos-cement compositions modified in accordance with the teachings of the present invention exhibit greatly improved thermal shock resistance.

EXAMPLE 2

A thermal shock resistance study is conducted using high asbestos fiber content portland cement articles containing 44% asbestos fiber and 33% portland cement on a dry solids basis. A number of autoclaved samples are prepared containing 10 percent, by weight of the total dry solids, of talc or asbestos floats as replacement for silica flour, as well as samples containing no replacement of silica flour. One face of each sample is exposed to a temperature of 100°F for 15 minutes on a hot plate after adjusting the moisture content to a normal level, about 12% by weight, or to the saturated level. The standard samples containing no talc or asbestos floats explode at both moisture content levels, whereas the samples modified with 10% asbestos floats or talc substituted for silica remain intact.

EXAMPLE 3

The thermal shock resistance of asbestos-cement articles formed by autoclaving an extruded asbestos-cement composition is ascertained. The extruded compositions contain 20% asbestos fiber, 50% portland cement, and 30% in the aggregate of silica, inorganic additive to improve thermal shick resistance, and a small amount of an ingredient to aid extrusion, a hydromodifier (Methocel).

The test for thermal shock resistance is conducted by first saturating the similarly-shaped, extruded, autoclaved, asbestos-cement articles by submerging in water for 24 hours. The articles are removed from the water and immediately placed in a furnace held at 700°C.

Articles containing 20% by weight of one of the additives listed (desert talc, asbestos floats, asbestos tailings and ground serpentine rock) do not exhibit cracking after one hour in the furnace.

Similarly, articles containing 15% by weight of one of the above four inorganic additives do not exhibit cracking upon exposure to 700°C for one hour.

Articles formed from compositions containing no porosity increasing additive uniformly failed the thermal shock test, usually by exploding within 2–3 minutes.

The results of these tests show that the above inorganic additives of this invention when added in sufficient quantity effectively and dramatically increase the thermal shock resistance of typical formulations for extruded asbestos-cement articles when the inorganic additives are substituted for silica.

EXAMPLE 4

A number of asbestos-cement compositions are prepared by the extrusion process and contain 50% portland cement, 20% asbestos, and 30% of a mixture of silica flour and a finely divided porosity increasing additive. A number of control compositions including no additive and 30% silica flour are also prepared. In all cases, an extrusion facilitating hydromodifier such as Methocel or Polyox is provided.

Each of the compositions is shaped into an 8 inch by 3 inch by ¼ inch sample and either autoclave cured or moist air cured. After curing, the samples are saturated in water for 24 hours, and then placed directly in the furnace at 700°C for one hour to test their resistance to thermal shock. The results are summarized in Tables III, IV and V. In this regard, it should be noted that the hydromodifier tends to decrease porosity. Hence, with increases in hydromodifier, a greater amount of additive is generally required to eliminate thermal shock, as illustrated in the tables.

Table III

| Thermal Shock Resistance of Asbestos-Cement Products Without Additives | | | | | | | |
|---|---|---|---|---|---|---|---|
| Cure | Asbestos Fiber Level (%) | Hydromodifier Content (%) | | | | | |
| | | 0.6 | 0.45 | 0.4 | 0.3 | 0.2 | 0.1 |
| Autoclave | 20 | X | X | X | X | X | ✓ |
| | 15 | | X | X | | X | |
| | 10 | | X | X | | X | |
| Moist Air | 20 | X | | X | X | ✓ | ✓ |

X - failed the thermal shock test by explosion
- passed the thermal shock test

Table IV

| Thermal Shock Resistance Properties With 10–16 Per Cent Additive Replacing SiO₂ | | | | | | | |
|---|---|---|---|---|---|---|---|
| Cure | Additives (%) | Hydromodifier Content (%) | | | | | |
| | | 0.6 | 0.4 | 0.3 | 0.2 | 0.1 | 0.033 |
| Autoclave | Desertalc | X | | X | ✓ | | ✓ |
| | Chrysotile fiber grade 7RF1 | X | | X | | ✓ | ✓ |
| | Chrysotile fiber | | | | | | |

Table IV-continued

Thermal Shock Resistance Properties
With 10–16 Per Cent Additive Replacing $SiO_2$

| Cure | Additives (%) | Hydromodifier Content (%) | | | | | |
|---|---|---|---|---|---|---|---|
| | | 0.6 | 0.4 | 0.3 | 0.2 | 0.1 | 0.033 |
| | grade 8T | X | | X | ✓ | | ✓ |
| | Serpentine | X | | X | ✓ | | ✓ |
| | Mg(OH)$_2$ | X | | | | | |
| | Desertalc | X | | X | | X | |
| | Chrysotile fiber grade 7RF1 | X | | X | | | ✓ |
| Moist Air | Chrysotile fiber grade 8T | | X | | ✓ | | |
| | Serpentine Mg(OH)$_2$ | | X | | 30% loss | ✓ | |
| | Celite diatomaceous earth | | | | | | ✓ |

X - failed the thermal shock test by explosion
✓ - passed the thermal shock test Table V Thermal Shock Resistance Properties
With 17.5 to 20 Per Cent Additive Replacing $SiO_2$

| Cure | Additives (%) | Hydromodifier Content (%) | | | | | |
|---|---|---|---|---|---|---|---|
| | | 0.6 | 0.4 | 0.3 | 0.2 | 0.9 | 0.033 |
| Autoclave | Desertalc | X | | | ✓ | ✓ | |
| | Chrysotile fiber grade 7RF1 | ✓ | | | ✓ | ✓ | |
| | Chrysotile fiber grade 8T | ✓ | | | ✓ | | |
| | Serpentine Mg(OH)$_2$ | ✓ ✓ | | | ✓ | | |
| | Desertalc | X | | X | | ✓ | |
| | Chrysotile fiber grade 7RF1 | X | | ✓ | | ✓ | |
| Moist Air | Chrysotile fiber grade 8T | ✓ | X | | ✓ | | |
| | Serpentine Mg(OH)$_2$ | ✓ | X | | | | |
| | Celite diatomaceous earth | | | | | ✓ | |

X - Failed the thermal shock test by explosion
✓ - passed the thermal shock test The invention in its broader aspects is not limited to the specific details shown and described and departures may be made from such details without departing from the principles of the invention and without sacrificing its chief advantages.

What I claim is:

1. A thermal shock resistant asbestos-cement composition consisting essentially of the following ingredients, in percentage by weight on a dry solids basis:
   a. 10 to 50% asbestos fibers;
   b. silica in a percentage in the range of 20 to 40% less the percentage of the organic porosity-enhancing additive of (d) below;
   c. 25 to 65% hydraulic cement; and
   d. 1 to 30% of an organic fibrous porosity-enhancing additive selected from the group consisting of nylon fibers, orlon fibers and sisal fibers, said additive being of the type which will prevent surface cracking of a product made of said composition when said product is saturated with water and then subjected to temperatures on the order of 700°C for a period of one hour.

2. The composition of claim 1 further consisting essentially of a hydromodifier.

3. The composition of claim 1 wherein said additive is present as 1 to 5% of said admixture.

4. A process for the formation of a thermal shock resistant asbestos-cement product which comprises:
   a. forming an aqueous admixture of, in percentage by weight on a dry solids basis:
      i. 10 to 50% asbestos fibers;
      ii. silica in a percentage in the range of 20 to 40% less the percentage of the organic porosity-enhancing additive of (iv) below;
      iii. 25 to 65% hydraulic cement; and
      iv. 1 to 30% of an organic fibrous porosity-enhancing additive consisting of nylon fibers, orlon fibers and sisal fibers, said additive being of the type which will prevent surface cracking of said product when said product is saturated with water and then subjected to temperatures on the order of 700°C for a period of one hour,
   b. shaping said admixture to form a shaped body; and
   c. curing said body to produce said product.

5. The composition of claim 4 wherein said additive is present as 1 to 5% of said admixture.

6. The process of claim 4 wherein said curing step comprises autoclaving said shaped body.

7. The process of claim 4 wherein said admixture further comprises a hydromodifier.

8. The process of claim 7 wherein said shaping step comprises extruding said admixture.

* * * * *

UNITED STATES PATENT AND TRADEMARK OFFICE
CERTIFICATE OF CORRECTION

PATENT NO. : 3,933,515
DATED : January 20, 1976
INVENTOR(S) : Julie Chi-Sun Yang It is certified that error appears in the above-identified patent and that said Letters Patent are hereby corrected as shown below:

Column 2, line 5, "providing" should read --producing--

Column 2, line 29, "thermal" should follow after "superior"

Table II, Column numbered (10) "Serpentine rock" under (10) should have a --X-- not an *.

Table II, Column numbered (10) "1 hr cracked into 1" should read --1 hr cracked into 3--

Table III; at the end of this table, " passed the thermal shock test" should have a ✓ mark before it.

Table V, Column numbered (0.6) "Serpentine" delete the ✓ mark

Table V, Column numbered (0.9) should read --0.1--

Signed and Sealed this

Sixth Day of July 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,933,515
DATED : January 20, 1976
INVENTOR(S) : Julie C. Yang

It is certified that error appears in the above-identified patent and that said Letters Patent are hereby corrected as shown below:

Delete "orlon" and substitute therefore -- Orlon -- at each of the following locations:

Column 4, line 3
    Column 5, line 68
    Table II, second and third lines from the bottom
    Column 11, line 55 (Claim 1)
    Column 12, line 48 (Claim 4)

Also add at the bottom of each of Columns 4,5,7, 11 and 12 the following footnote:

-- Orlon- is the registered trademark of E.I. duPont de Nemours and Company for acrylic fiber.--

Signed and Sealed this

Fourth Day of January 1977

[SEAL]

Attest:

RUTH C. MASON
*Attesting Officer*

C. MARSHALL DANN
*Commissioner of Patents and Trademarks*